US008700708B2

(12) United States Patent
Richter et al.

(10) Patent No.: US 8,700,708 B2
(45) Date of Patent: Apr. 15, 2014

(54) SOCIAL DATA RECORDING

(75) Inventors: Michael Judd Richter, Atherton, CA (US); Matthew William Kelly, Palo Alto, CA (US); Austin Haugen, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 207 days.

(21) Appl. No.: 13/116,909

(22) Filed: May 26, 2011

(65) Prior Publication Data

US 2012/0303702 A1 Nov. 29, 2012

(51) Int. Cl.
*G06F 15/16* (2006.01)

(52) U.S. Cl.
USPC .......................................... 709/204; 709/246

(58) Field of Classification Search
USPC .......................................... 709/204, 798, 246
See application file for complete search history.

(56) References Cited

U.S. PATENT DOCUMENTS

| | | | | |
|---|---|---|---|---|
| 6,434,599 | B1 | 8/2002 | Porter | |
| 7,702,653 | B1 | 4/2010 | Tan | |
| 7,788,260 | B2 | 8/2010 | Lunt | |
| 7,890,501 | B2 | 2/2011 | Lunt | |
| 7,945,861 | B1 | 5/2011 | Karam | |
| 7,949,611 | B1 | 5/2011 | Nielsen | |
| 8,239,364 | B2 | 8/2012 | Wable | |
| 2003/0179222 | A1 | 9/2003 | Noma | |
| 2005/0004985 | A1 | 1/2005 | Stochosky | |
| 2005/0198031 | A1 | 9/2005 | Pezaris | |
| 2006/0026233 | A1 | 2/2006 | Tenembaum | |
| 2007/0214121 | A1 | 9/2007 | Ebanks | |
| 2007/0282950 | A1 * | 12/2007 | Fischer et al. | 709/204 |
| 2008/0005223 | A1 | 1/2008 | Flake | |
| 2008/0016164 | A1 | 1/2008 | Chandra | |
| 2008/0040673 | A1 | 2/2008 | Zuckerberg | |
| 2008/0243830 | A1 | 10/2008 | Abhyanker | |
| 2009/0106822 | A1 | 4/2009 | Obasanjo | |
| 2009/0254843 | A1 | 10/2009 | Wie | |
| 2009/0287645 | A1 | 11/2009 | Dasdan | |
| 2010/0023584 | A1 | 1/2010 | Kamdar | |
| 2010/0132049 | A1 | 5/2010 | Vernal | |
| 2010/0177696 | A1 * | 7/2010 | Jung et al. | 370/328 |
| 2011/0022657 | A1 | 1/2011 | Zhu | |
| 2011/0055314 | A1 | 3/2011 | Rosenstein | |

(Continued)

FOREIGN PATENT DOCUMENTS

JP 2009-181260 8/2009

OTHER PUBLICATIONS

International Search Report and Written Opinion for International Application PCT/US2012/038916, Dec. 20, 2012.

(Continued)

*Primary Examiner* — Un C Cho
*Assistant Examiner* — M Mostazir Rahman
(74) *Attorney, Agent, or Firm* — Baker Botts L.L.P.

(57) ABSTRACT

In particular embodiments, a method comprising, by one or more computing devices, analyzing one or more elements of a displayed structured document to identify one or more objects from a plurality of objects within the displayed structured document, responsive to detected user interaction by a user with a first object of the one or more identified objects, generating data indicating an edge relationship from the first object and the user, and transmitting the data indicating the edge relationship to a social networking system.

20 Claims, 4 Drawing Sheets

(56) References Cited

U.S. PATENT DOCUMENTS

| | | | | |
|---|---|---|---|---|
| 2011/0061016 | A1 | 3/2011 | Song | |
| 2011/0066636 | A1 | 3/2011 | Guido | |
| 2011/0087658 | A1 | 4/2011 | Lunt | |
| 2011/0093460 | A1 | 4/2011 | Lunt | |
| 2011/0093498 | A1 | 4/2011 | Lunt | |
| 2011/0099167 | A1 | 4/2011 | Galbreath | |
| 2011/0099495 | A1 | 4/2011 | Harrington | |
| 2011/0119335 | A1* | 5/2011 | Galbreath et al. | 709/204 |
| 2012/0278343 | A1 | 11/2012 | Steele | |
| 2012/0290637 | A1 | 11/2012 | Perantatos | |
| 2012/0317109 | A1 | 12/2012 | Richter | |
| 2012/0331067 | A1 | 12/2012 | Richter | |

OTHER PUBLICATIONS

International Search Report and Written Opinion for PCT/US2012/040976, Dec. 26, 2012.
International Search Report and Written Opinion for PCT/US2012/038918, Nov. 30, 2012.
International Search Report and Written Opinion for PCT/US2012/038237, Dec. 6, 2012.
Office Action for U.S. Appl. No. 13/159,247, Apr. 1, 2013.
Office Action for U.S. Appl. No. 13/168,808, Jun. 26, 2013.
Office Action for U.S. Appl. No. 13/116,945, Apr. 26, 2013.
Office Action for U.S. Appl. No. 13/116,923, Apr. 18, 2013.
Office Action for U.S. Appl. No. 13/116,682, Jan. 31, 2013.
Final Office Action for U.S. Appl. No. 13/116,682, Jun. 13, 2013.

* cited by examiner

SOCIAL DATA RECORDING

TECHNICAL FIELD

The present disclosure generally relates to a social networking system, and more specifically relates to observing browsing activity and creating edges between users and digital objects that users have accessed or otherwise interacted with.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system.

A social networking system may support application programming interfaces and associated functionality that allows third-party systems to access user profile data of its users. Such third party websites can use the user profile data can use the identity and account of a user for purposes of identifying users and maintaining their accounts at such third party websites. These third party websites may also access user profile data in order to personalize or customize the user experience on the site.

SUMMARY

The present disclosure generally relates to social networking system, and more specifically relates to creating social networking edges in connection with third party websites.

In particular embodiments, a method comprising, by one or more computing devices, analyzing one or more elements of a displayed structured document to identify one or more objects from a plurality of objects within the displayed structured document, responsive to detected user interaction by a user with a first object of the one or more identified objects, generating data indicating an edge relationship from the first object and the user, and transmitting the data indicating the edge relationship to a social networking system.

These and other features, aspects, and advantages of the disclosure are described in more detail below in the detailed description and in conjunction with the following figures.

DESCRIPTION OF EXAMPLE EMBODIMENTS

Figure 1:
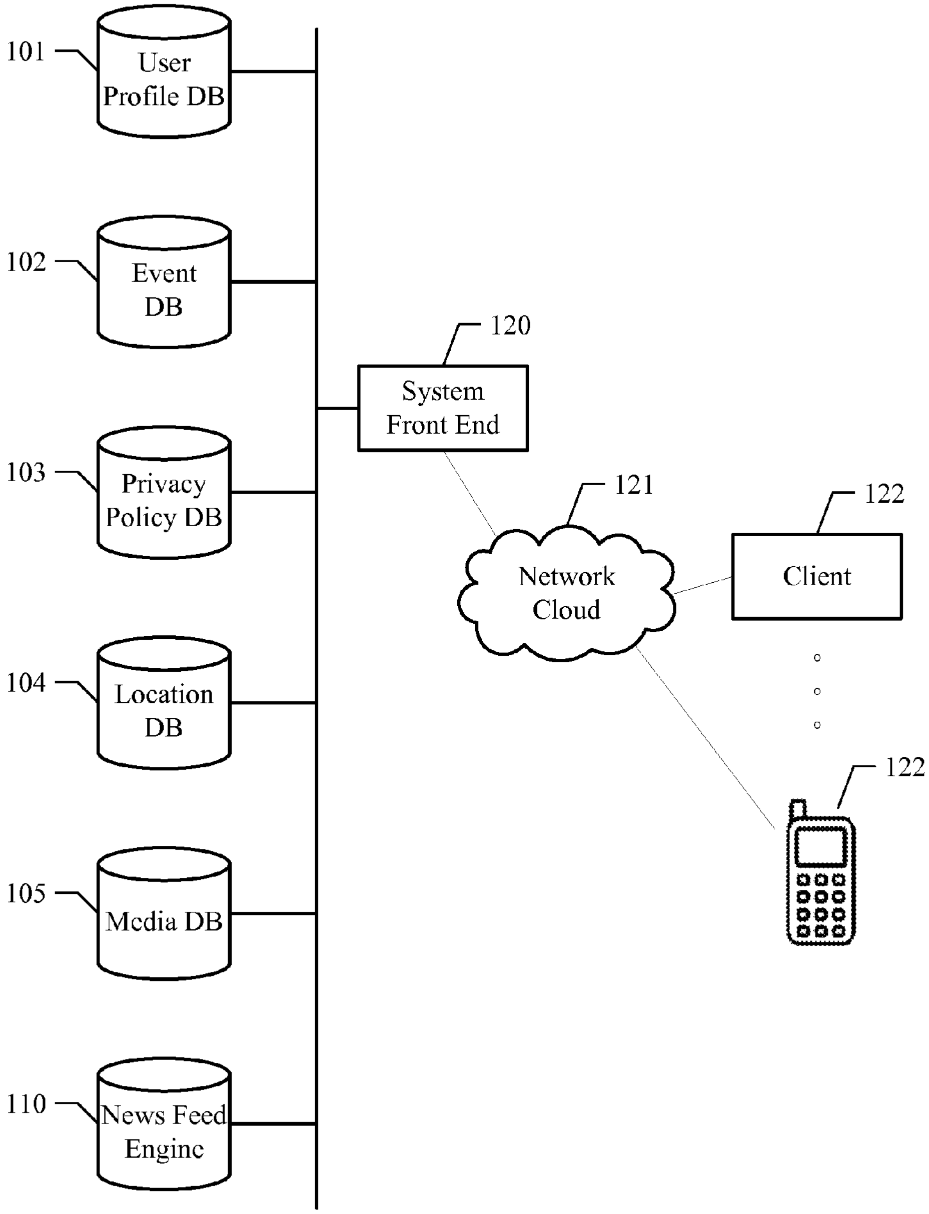
FIG. 1 illustrates an example social network system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Social Network Systems and Accessible User Profile Data

A social networking system, such as a social networking website, enables its users to interact with it, and with each other, through the system. Typically, to become a registered user of a social networking system, an entity, either human or non-human, registers for an account with the social networking system. Thereafter, the registered user may login to the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile," in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time.

The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

In particular embodiments, an edge may be one of a plurality of edge types based at least in part on the types of nodes that the edge connects in the social graph. In particular embodiments, for example, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In particular embodiments, the edge itself may store, or be stored with, data that defines a type of connection between the pair of nodes the edge connects. In particular embodiments, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other particular embodiments, data that may indicate the type of connection or relationship between nodes connected by an edge may be stored with the nodes themselves.

Similar to user profile pages, concept profile pages ("hubs") share information related to the concept associated with the corresponding hub node. In particular embodiments, any registered user logged in to social networking system and viewing a hub may add content to the hub similar to a wiki-site. A hub may also generally include a basic information section, a detailed info section, as well as, potentially, other sections, any and all of which may generally be filled in by any user viewing the hub. In particular embodiments, wall (or news feed/activities feed) section, or other feed or activities section of the hub, displays comments, status updates, wall posts and other user activities associated with the user and friends of the user that are viewing the hub. The wall (or news feed/activities feed) section, or other feed or activities section of the hub may also display comments, status updates, wall posts and other user activities and user generated content that are related to the concept for which the hub was created. A hub may also include a photo or picture section under photos tab allowing users to upload images in or related to the concept, one of which may be selected as a profile picture for the hub. Furthermore, some hub nodes need not be exposed to users as pages and can be nodes that are associated with other hub nodes by some relationship or edge, such as an instance of a concept, such as a particular recording of a song or video being associated with a hub node corresponding to the concept of the song itself.

In particular embodiments, user nodes and hub nodes stored in the social graph database may be connected with one another via edges. In particular embodiments, each edge may be classified or characterized by an edge type of a plurality of edge types that define, indicate, or characterize the connection between the pair of nodes connected by the edge. In particular embodiments, edges define friendship or other social relationship connections between users (e.g., friends) associated with the respective user nodes.

A social networking system may support a variety of applications, such as photo sharing, on-line calendars, search, events, and location-based services. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. In some implementations, a check-in edge may be created between a user and a place upon detection of a user checking in.

FIG. 1 illustrates an example social networking system. In particular embodiments, the social networking system may store user profile data and social graph information in user profile database 101. In particular embodiments, the social networking system may store user event data and calendar data in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, 105, and 110 may be operably connected to the social networking system's front end 120. In particular embodiments, the front end 120 may interact with client device 122 through network cloud 121. Client device 122 is generally a computer or computing device including functionality for communicating over a computer network (e.g., remotely). Client device 122 may be a desktop computer, laptop computer, personal digital assistant (PDA), in- or out-of-car navigation system, smart phone or other cellular or mobile phone, or mobile gaming device, among other suitable mobile computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, user profile database 101 may store communication channel information and an address book of a user. The address book, in one implementation, may be a superset or a subset of the users of the social networking system that a user has established a friend or contact relationship. In particular embodiments, event database 102 may store event data for any number of particular events and the data associated with each event including the name of the event, the date and time of the event, the event location, particular users who are invited to participate or who are participating in the event, and other user or participant's comments about the event. For example, a user may schedule an event through the social networking system, which has an associated link so that any invited user may participate, or any user if the event is open to any user.

In particular embodiments, privacy policy database 103 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database 103.

In particular embodiments, a user's privacy data may comprise privacy settings associated with any aspect of the user profile, including changes that the user makes to the user profile, events, locations, media, activities, connections between one or more users, the news feed associated with the user or any other action that the user takes in the social networking system. In particular embodiments, the privacy settings associated with the privacy policy database 103 may be provided and stored at different levels of granularity. In particular embodiments, for example, the information to be shared may be specific information, such as, work phone number, or a set of related information, such as, personal information including several pieces of related information including profile photo, home phone number, and status. Alternatively, in particular embodiments, the privacy settings associated with the privacy policy database 103 may apply to all the information associated with the user in the social networking system.

In particular embodiments, the specification of the set of entities that may access particular user information may also be specified at various levels of granularity. In particular embodiments, the user may specify any number of entities with which information may be shared. In particular embodiments, sets of entities with which information may be shared may include, for example, specified friends of the user, all friends of the user, all friends of friends, all applications, and all external systems. In particular embodiments, for example, the user may provide a list of external systems that may access certain information as well.

In particular embodiments, may specify a set of entities that includes exceptions that are not allowed to access the user's information. In particular embodiments, for example, the user of the social networking system may allow all external systems to access the user's work information but specify a list of external systems that are not allowed to access the work information. In particular embodiments, the list of exceptions that are not allowed to access certain information of the user may be a "block list." In particular embodiments, external systems belonging to a block list specified by a user of the social networking system are blocked from accessing the information specified in the privacy setting stored in privacy policy database 103. Particular embodiments contemplate various combinations of granularity of permitted access or denial of access depending on the type of user information and sets of entities with which information may be shared or accessed by the sets of entities, as specified by the user and stored in the privacy policy database 103.

The social networking system may also include media sharing capabilities. In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates.

In particular embodiments, a user of the social networking system may share media hosted by external websites with the social networking system. In particular embodiments, external websites may have "share" buttons that are operative to transmit links to the content to the social networking system and post the links as wall post entries for a user profile. In particular embodiments, the buttons are operative to transmit activity stream entries to the social networking system, which will post the entry in a news feed. In particular embodiments, for example, a user can access a photo, a photo album, a video clip, or other media from a client device 122 and post links to that content on the wall associated with a user profile on social networking system.

Figure 2:
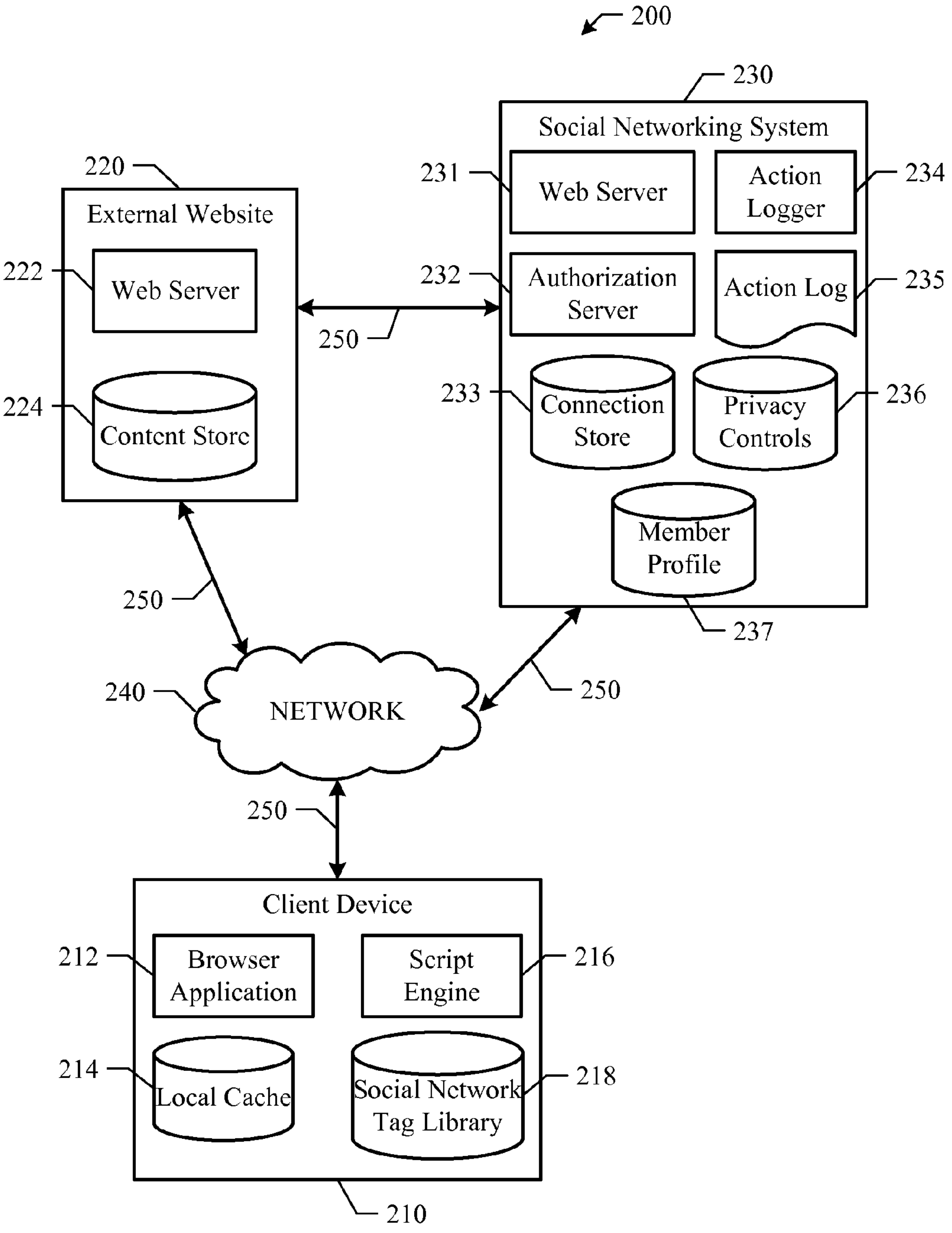
FIG. 2 illustrates an example system.

FIG. 2 illustrates a particular embodiment of a system that includes a client device 210, an external website 220, and a social networking system 230. In particular embodiments, links 250 illustrate interactions between client device 210 and external website 220, between client device 210 and social networking system 230, and between external website 220 and social networking system 230.

In particular embodiments, client device 210 may host a browser application 212 or other application that processes structured documents. In particular embodiments, client device 210 may have received one or more structured documents from external website 220 and/or social networking system 230. In particular embodiments, the structured document may be a markup language document that contains text, links, scripts, and other attributes, such as API calls identifying social network data elements of a user profile maintained by social networking system 230. In particular embodiments, the structured document may contain instructions, for example, to specify how to render content for display at client device 210. In particular embodiments, the structured document may contain instructions, for example, on how to access additional information from social networking system 230. Alternatively, the instructions within structured document may contain program logic interpreted by a scripting engine 216 on the client device 210.

In particular embodiments, browser application 212 may process the markup language in the structured document and render the structured document as a displayable web page. In particular embodiments, the displayable web page may include content of the external website 220 as well as one or more of the located social network data elements of the social networking system 230. In particular embodiments, browser application 212 may display the rendered web page on a display of client device 210. For example, a structured document hosted by external website 220 may contain an API call for a profile picture of a user. The browser application 212, when processing the structured document, may transmit a request to social networking system 230 to retrieve the user's profile picture. The request may be an HTTP request and may further include a browser cookie with information identifying the user of social networking system 230. The browser cookie may include state and other information indicating the status of the user, for example, whether the user has recently logged in and/or authenticated to the social networking system 230.

Still further, the structured document provided by external website 220 may include a segment (such as a div or iframe) that prompts the user to log in to social network system 230. For example, the structured document may include HTML code, Javascript and other controls that cause the browser hosted by client device 210 to access social networking system 230 and render a login interface in a section of the displayed structured document.

In particular embodiments, external website 220 may be any website accessible on the Internet, and may have various formats, such as, for example and without limitation, text, audio, video, images, web pages, documents, executables, etc. Examples of external website 220 that provides audio content includes, but is not limited to, Pandora (http://www.pandora.com), or Rhapsody (http://www.rhapsody.com), etc. Examples of external website 220 that provide video or other content include, but are not limited to, Hulu (http://www.hulu.com), YouTube (http://www.youtube.com), or The New York Times (http://www.nytimes.com), etc. In particular embodiments, external website 220 and its contents may be stored at many different sites, such as on computers and servers, in databases, etc., around the world. These different sites are communicatively linked to the Internet through various network infrastructures and the Uniform Resource Locator (URL) of external website 220 specifies where the corresponding document is located and the mechanism for retrieving it. Any person may access the publicly available external website 220 or its contents via a suitable network device (e.g., a computer, a smart mobile telephone, etc.) connected to the Internet.

In particular embodiments external website 220 and social networking system 230 may have one or more users or members. In particular embodiments, users of external website 220 may also be users of social networking system 230. In particular embodiments, a user may interact with external website 220 and/or the social networking system 230 using client device 210. In particular embodiments, the social networking system 230 may keep user profile information and the connections among the users.

In particular embodiments, the social networking system 230 may receive requests from either the external website 220 or the client device 210 to which the social networking system 230 may respond with the requested information or with a subset of the requested information. Particular interactions between client device 210, the external website 220, and the social networking system 230 and information exchanged between the three systems will be described later in detail. As discussed in more detail below, implementations of the invention include augmented client-side functionality directed to informing the user as to which social network data elements of the user the external website 220 desires access and allows the user to control such access consistent with his or her privacy configurations.

In particular embodiments, social networking system 230 may include a web server 231, an authorization server 232, an action logger 234, an action log 235, a connection database 233, and other databases 236, 237, such as the databases described in FIG. 1.

In particular embodiments, social networking system 230 may include additional, fewer, or different modules for various applications. Conventional components such as network interfaces, security mechanisms, load balancers, failover servers, management and network operations consoles, and the like are not shown so as to not obscure the details of the system and will be described later. In particular embodiments, the social networking system 230 comprises a computing system that allows users to communicate or otherwise interact with each other and access content as described herein. These and other functionalities of social networking system 230 have also been described in detail above.

In particular embodiments, the social networking system 230 stores data describing one or more connections between different users in the connection database 233. Particular embodiments of the connection database 233 may store connection information for users who have indicated similar or common work experience, group memberships, hobbies, or educational history. In particular embodiments, the social networking system 230 may also include user-defined connections between different users and those connections may be stored in connection database 233 as well. Particular embodiments of connection database 233 may allow users to specify their relationships with other users. In particular embodiments, for example, these user defined connections allows users to generate relationships with other users that parallel the users' real-life relationships, such as friends, relatives, co-workers, partners, and so forth. In particular embodiments, users may select from predefined types of connections, or define their own connection types, as needed.

In particular embodiments, the web server 231 links the social networking system 230 via the network 240 to one or more client devices 210. In particular embodiments, the web server 231 serves web pages, as well as other web-related content, such as Java, Flash, XML, and so forth. Particular embodiments of the web server 231 may include a mail server or other messaging functionality for receiving and routing messages between the social networking system 231 and the client devices 210. In particular embodiments, the messages may be instant messages, queued messages (e.g., email), text and SMS messages, or any other suitable messaging technique.

In particular embodiments, the action logger 234 is capable of receiving communications from the web server 231 about user actions on and/or off the social networking system 230. In particular embodiments, the action logger 234 populates the action log 235 with information about user actions in order to track them. More specifically, any action that a particular user takes with respect to another user is associated with each user's profile through information maintained in a database or other data repository, such as the action log 235. In particular embodiments, the actions taken by the members that are recorded in the action log 235 may be actions taken by the members on the social networking system 230 or actions taken by the members on the external website 220. In particular embodiments, the actions taken by the members on an external website 220 are communicated to the web server 231 and the web server 231 sends a request to the action logger 234 to record the actions in the action log 235. In particular embodiments, such actions may include, for example, adding a connection to the other user, sending a message to the other user, reading a message from the other user, viewing content associated with the other user, attending an event posted by another user, among others. Additionally, in particular embodiments, actions in connection with other objects may be directed at particular users, and these actions may be associated with those users as well.

In particular embodiments, when a user takes an action on the social networking system 230, the action is recorded in an action log 235. In particular embodiments, the social networking system 230 maintains the action log 235 as a database of entries. In particular embodiments, when an action is taken on the social networking system 230, the social networking system 230 adds an entry for that action to the action log 235.

In particular embodiments, the authorization server 232 enforces the privacy settings of the users of the social networking system, such as described above with respect to privacy database 102. In particular embodiments, the privacy setting of a user determines how particular information associated with a user may be shared. In particular embodiments, as described above, the privacy policy database comprises the privacy data for a user's settings for each user datum associated with the user and the user's settings for third party applications. More specifically, the privacy data for a user's settings may specify particular information associated with a user and the entity or entities with whom the information may be shared. In particular embodiments, the entities with which information may be shared, may include users, third party applications, external websites, or any other entity that can potentially access the information. In particular embodiments, the information that may be shared by a user may comprise any aspect of the user profile, events, locations, media, activities, or the news feed associated with the user.

Particular embodiments relate to a plug-in software application (hereinafter referred to as "social enhancement application") that operates or executes in the context of a browser (e.g., a web browser) or other application client that consumes structured documents, such as HyperText Markup Language (HTML) or any other document format with structural semantics (e.g., Extensible HyperText Markup Language (XHTML), Extensible Markup Language (XML), Standard Generalized Markup Language (SGML), Portable Document Format (PDF), and the like). The functionality described herein may also be implemented as a native or integrated aspect of a browser or other client application. A web browser application is generally a computer program configured to run on a user's computing device (e.g., client device 122, 210) that enables the user to connect to various server-hosted webpages available over a network. A non-exhaustive set of common web browsers include, by way of example, Internet Explorer™, Firefox™, Safari™, and Opera™. The web browser provides a standard viewing window that displays the informational and visual content of the webpage or website (the term "website" and "webpage" may be used interchangeably herein where appropriate). The URL of the website presently being rendered and viewed is displayed in the address box of the web browser GUI. Address box enables a user to input an address (e.g., a URL) for a desired (target) webpage. The content of the website generally includes graphical images, text, and/or hyperlinks (e.g., comprising code segments that redirect the web browser and user to another portion of the webpage or to a subsequent webpage altogether without requiring manual input of the subsequent webpage's address). In various example embodiments, the webpage can also include audio, video, and other types of web content. To facilitate navigation of the rendered page, GUI 200 may include scrolling bars or buttons. By clicking and/or dragging these bars or buttons, a user may selectively view other portions of the webpage, which do not entirely fit the immediately viewable areas of the GUI rendered by the web browser.

Typically, a web browser is used to access a webpage (or other structured document) for rendering at a client device, obtains the required resources (e.g., in response to executing JavaScripts or other calls embedded in a requested and received structured document and which may include HTML or XML code and/or JavaScript scripts and/or content including text, audio, and video) for rendering the webpage from one or more servers and then constructs a browser representation of the webpage. In particular embodiments, for example, the browser representation may be a Document Object Model (DOM) representation of the webpage. The web browser then renders the page in the particular client viewing window of the browser utilizing the DOM (or other suitable) representation.

By way of background, the DOM is a cross-platform and language-independent convention for representing and interacting with objects in HTML, XHTML, and XML. Aspects of the DOM, such as its "Elements," may be addressed and manipulated within the syntax of the programming language in use. The public interface of a DOM is specified in its application programming interface (API) for, by way of example, valid HTML and well-formed XML documents. The programming interface of the DOM is defined by standard properties and methods.

A DOM representation of a structured document defines the logical structure of the document as well as the way the document may be accessed and manipulated. The structure of a DOM representation is generally based on an object structure that closely resembles the logical structure of the document (e.g., webpage) it models. In the DOM, HTML documents consist of a set of node objects. The DOM representation is generally hierarchical in nature. More specifically, by way of example, a DOM representation typically has a logical structure that resembles a tree or group of trees each having branches that link DOM nodes of a plurality of DOM levels. In such a manner, a given DOM node at one DOM level of the DOM hierarchy may have (hereinafter also "include," "comprise," or "be associated with") one or more "child" nodes each logically arranged in a lower child DOM level, that, in turn, each have one or more of their own child nodes logically arranged in a still lower grandchild DOM level. As those of skill in the art will appreciate, as one proceeds logically through the hierarchy to lower DOM levels, the corresponding DOM nodes in those lower levels become more detailed in their representation of ever-smaller logical portions of the corresponding structured document. In this way, all the text and other content specified in the underlying HTML and/or other code is translated by the browser into DOM nodes or elements of finer and finer granularity.

In particular embodiments, at a first level, the entire document (page) may be represented by a DOM root node. Progressing down the tree, the document may include a picture, video, interactive window, block of text, and/or other content including scripts and various calls to APIs represented in finer and finer detail by subsequent level nodes. In particular embodiments, the method may begin with the accessing of a target structured document by a web application or a web browser operating at a client device. Embodiments described herein identify objects in the page, such as an embedded digital video or music file, and record data related to the user's interactions with one or more objects in the page.

Social Data Recording

Figure 3:
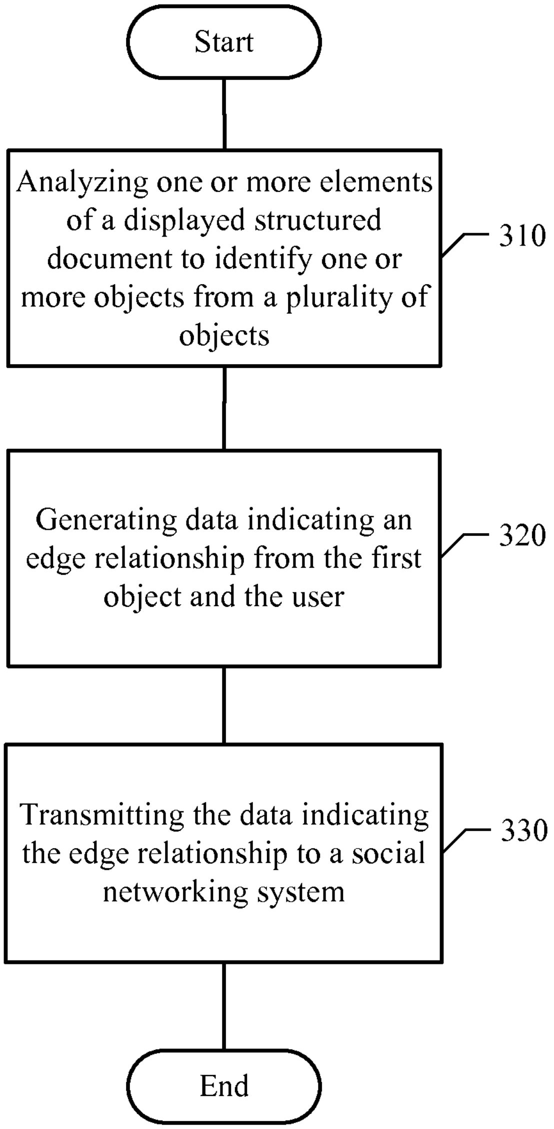
FIG. 3 illustrates an example method.

FIG. 3 illustrates an example method for recording social data generated by a user on a third party website and transmitting that data back to the social networking system. Particular embodiments analyze elements of a structured document to identify objects embedded within the document and to determine an edge type. For example, if the object is a video, the edge type may be a "watched" edge type. In particular embodiments a user may interact with some or all of the objects in the structured document. In response to the user interacting with the objects in the structured document, particular embodiments generate data indicating an edge relationship between an object and the user. Particular embodiments transmit the data indicating the edge relationship to a social networking system. The social networking system can process this data to, for example, augment a hybrid social graph discussed above to add an edge between the user and a node associated with the object. In particular embodiments, for example, a user may access a website, such as http://www.youtube.com. In particular embodiments, the web browser may detect that this is a video website and determine that if users interact with videos on this website, that watch edges may be created between the videos and the users. Additionally, in particular embodiments, the web browser may determine that a user may like, watch, read, listen, or have any number of additional types of interactions with this website. In particular embodiments, and data indicating an edge relationship may be generated in response to the user watching videos or interacting with the site in any additional way. In particular embodiments, the data may then be transmitted to the social networking system 230 upon the browser's detection of each click event.

Particular embodiments may analyze one or more elements of a displayed structured document to identify one or more objects from a plurality of objects within the displayed structured document, as illustrated in step 310. In particular embodiments, the structured document may have HTML denoting structural semantics for text and links, as well as images, web applications and other objects that can be embedded within the page. Generally, a web page may be delivered to a client device as a static document, however, through the use of web elements embedded in the page, an interactive experience may be achieved with the page or a sequence of pages. In particular embodiments, the structured document may include objects from a plurality of objects. Objects may be pictures, video, interactive windows, blocks of text, and/or other content including scripts and various calls to APIs. In particular embodiments, a resource or webpage, which may itself include multiple embedded resources, may include data records, such as content plain textual information, or more complex digitally encoded multimedia content, such as software programs or other code objects, graphics, images, audio signals, videos, and so forth. Typically, to render a webpage associated with a web application, the web application and/or web browser at a client device requires access to one or more resources provided at one or more backend servers of an associated website. In particular embodiments, in order to analyze the objects on a page, the browser at the client device requires access to the to the resources and objects of the external website 220.

In particular embodiments, for example, when a user accesses a web page, such as YouTube (http://www.youtube-.com), the web browser may detect that one or more objects of the structured document are videos, and therefore, that YouTube is a video website. In particular embodiments, the web browser may determine that users may interact with the videos on this website. Additionally, in particular embodiments, the web browser may determine that a user may like, watch, read, listen, or have any number of additional types of interactions with objects hosted by this website.

In particular embodiments, analyzing one or more elements of a displayed structured document comprises web page profiling using standard techniques. In particular embodiments, for example, standard techniques utilized may be the open graph protocol or other web scraping mechanisms if there are no open graph protocol tags present. The open graph protocol enables any web page to integrate into the social graph. In particular embodiments, the presence of basic metadata within the structured document allows objects within the structured document to become graph objects. The open graph protocol defines four required properties: title, type, image, url. In particular embodiments, there are object types, such as real world objects, that can be linked with the social graph. In particular embodiments, for example, object types may be activities, businesses, groups, organizations, people, places, products and entertainment, and websites. In particular embodiments, audio and video data may also become graph objects.

Web scraping, also called web harvesting or web data extraction, is a computer software technique of extracting information from websites. Web scraping is the process of automatically collecting Web information. Usually such software programs simulate human exploration of the web by either implementing low-level HTTP or embedding full-fledged web-browsers, such as Internet Explorer and the Mozilla web browser. Web scraping is closely related to Web indexing, which indexes Web content using a bot and is a universal technique adopted by most search engines. In contrast, Web scraping focuses more on the transformation of unstructured Web content, typically in HTML format, into structured data that can be stored and analyzed in a central local database or spreadsheet. Web scraping is also related to Web automation, which simulates human Web browsing using computer software. Uses of Web scraping include online price comparison, weather data monitoring, website change detection, Web research, Web content mashup and Web data integration. Web scraping is a field with active developments. Therefore, there are different levels of automations that existing Web-scraping technologies can provide, such as human copy-and-paste, text grepping and regular expression matching, HTTP programming, DOM parsing, web-scraping software, vertical aggregation platforms, and semantic annotation recognition.

Particular embodiments responsive to detected user interaction by a user with a first object of the one or more identified objects, generate data indicating an edge relationship from the first object and the user, as illustrated in step 320. In particular embodiments, each of the objects within a structured document may have an edge type. In particular embodiments, edge types may be one of a plurality of edge types, such as watch, listen, view, click, mouse-over, or any other types of interaction that a user may have with a structured document. In particular embodiments, edge types may be based on current or past user interactions with the displayed structured document. In particular embodiments, the generation of data indicating an edge relationship between the first object and the user may be done in a similar manner as automatic edge generation in an integrated social graph, as described in U.S. patent application Ser. No. 12/763,145, which is incorporated by reference herein for all purposes.

In particular embodiments, for example, YouTube may have a plurality of edge types present because a user may like, watch, read, listen, or have any number of additional types of interactions with objects this website. In particular embodiments, as described in detail above, the edges created define a connection between the user and the object on the website. In particular embodiments, these edges representing connections may also be created between objects of the website and hubs. In particular embodiments, when a user watches a video on YouTube, data representing a first edge, a watch edge, may be generated between the user and the particular video that the user has accessed. Further, in particular embodiments, if the user "likes" this video, a second edge, a like edge, will be created between the user and the video.

Particular embodiments transmit the data indicating the edge relationship to a social networking system, as illustrated in step 330. In particular embodiments, data indicating the edge relationship may be transmitted to the social networking system upon the web browser's detection of a click event with respect to each of the objects of the structured document. In particular embodiments, for example, when a user clicks on a play control to watch a video on YouTube or "likes" the video on YouTube, a click event occurs. In particular embodiments, once the click event has occurred, and one or more edges has been created between the video and the user, the data indicating the edge relationship, in this case a watch edge and a like edge, may be stored at the client device and transmitted back to the social networking system.

In particular embodiments, even if the user is not logged into the social networking system 230, if the user preferences indicate that the user's data indicating an edge relationship may be transmitted to the social networking system, in particular embodiments, the data is transmitted to the social networking system. In particular embodiments, as described above with respect to privacy policy database 103, a user may store privacy settings and may specify particular entities, third party applications, or website domains that may or may not be allowed to access the user's information in the social networking system. Such privacy controls can also control whether a user's activities at particular websites or classes of websites will be recorded and/or displayed to other users of the social networking system. In particular embodiments, the user's privacy settings may grant full access to all third party entities, third party applications, or website domains. In particular embodiments, the user's privacy settings may restrict specific entities, third party applications, or website domains. In particular embodiments, the user's privacy settings may limit or grant access to particular types of social network data. Particular embodiments, for example, may merely restrict the types of social network data that the browser or plug-in may record and transmit.

In particular embodiments, if there is no set of user preferences with which to determine whether data indicating an edge relationship may be transmitted to the social networking system, the user may be prompted to transmit the data indicating the edge relationship to the social networking system. Once the user indicates that the data may be transmitted to the social networking system, the data indicating the edge relationship will be transmitted to the social networking system even if the user is not logged into external website 220 or the social networking system 230. In particular embodiments, the user may be prompted to login to the social networking system prior to transmitting the data indicating the edge relationship to the social networking system. More specifically, the user may login to the social networking system via the user's account by providing, for example, a correct login ID or username and password.

In particular embodiments, an activity stream entry is generated that corresponds to the interaction of the user with the first object, wherein the activity stream entry includes data describing the first object as well as the user ID of the user that interacted with the object. In particular embodiments, the activity stream entry is transmitted to the social networking system and may be processed by action logger 234. In particular embodiments, the activity stream entry may be posted to the wall associated with the user of the social networking system or processed to augment the hybrid social graph, discussed above, to add an edge between the user node and a node associated with the object.

Figure 4:
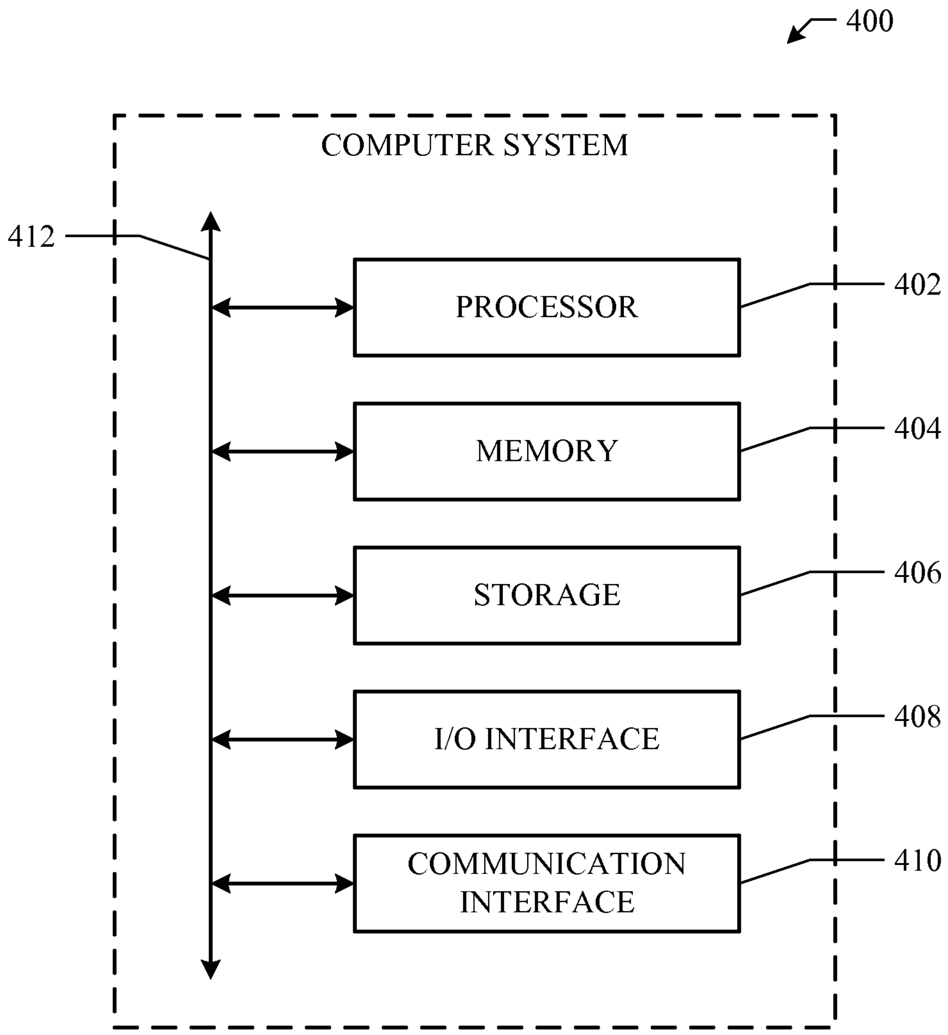
FIG. 4 illustrates an example computer system.

Particular embodiments may be implemented on one or more computer systems. FIG. 4 illustrates an example computer system 400 that may be used to implement a host, such as a server, client desktop computer or mobile device, that executes the functionality described above. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:

analyzing, by one or more computing devices, one or more elements of a displayed structured document to identify one or more objects from a plurality of objects embedded within the displayed structured document, wherein a user can interact with the objects, which comprises content;

responsive to detected interaction by a first user with a first object of the one or more identified objects, wherein the first user and the first object are represented by respective nodes in a social graph, generating data relating to an edge relationship between the node representing the first object and the node representing the first user, wherein an edge type for the edge relationship is based at least in part on the detected interaction by the first user with the first object; and transmitting the data indicating the edge relationship to a social-networking system.

2. The method of claim 1, further comprising:

generating an activity stream entry corresponding to the interaction, the activity stream entry comprising data describing the first object; and transmitting the activity stream entry to the social-networking system.

3. The method of claim 1, wherein analyzing the elements of the displayed structured document comprises web-page profiling using standard techniques.

4. The method of claim 1, wherein one or more of the objects have an edge type.

5. The method of claim 4, wherein the edge type is based at least in part on one or more previous interactions between one or more second users and the displayed structured document.

6. The method of claim 1, wherein transmitting the data is based at least in part on a set of user preferences for the social-networking system for the first user.

7. The method of claim 6, further comprising, if there is no set of user preferences, prompting the first user to transmit the data indicating the edge relationship to the social-networking system.

8. The method of claim 1, wherein transmitting the data requires confirmation by the first user prior to transmitting the data.

9. The method of claim 1, wherein the objects embedded within the displayed structured document are displayed as part of a web page.

10. The method of claim 1, wherein analyzing the elements of the displayed structured document comprises utilizing an open graph protocol.

11. A system comprising:

one or more processors; and a memory coupled to the processors comprising instructions executable by the processors, the processors being operable when executing the instructions to:

analyze one or more elements of a displayed structured document to identify one or more objects from a plurality of objects embedded within the displayed structured document, wherein a user can interact with the objects, which comprise content;

responsive to detected user interaction by a user with a first object of the one or more identified objects, wherein the first user and the first object are represented by respective nodes in a social graph, generate data relating to an edge relationship between the node representing the first object and the node representing the first user, wherein an edge type for the edge relationship is based at least in part on the detected interaction by the first user with the first object; and transmit the data indicating the edge relationship to a social-networking system.

12. The system of claim 11, wherein the processors are further operable when executing the instructions to:

generate an activity stream entry corresponding to the interaction, the activity stream entry comprising data describing the first object; and transmit the activity stream entry to the social-networking system.

13. The system of claim 11, wherein one or more of the objects have an edge type.

14. The system of claim 13, wherein the edge type is based at least on part on one or more previous interactions between one or more second users and the displayed structured document.

15. The system of claim 11, wherein transmitting the data is based at least in part on a set of user preferences for the social-networking system for the first user.

16. One or more computer-readable non-transitory storage media embodying software that is operable when executed to:

analyze one or more elements of a displayed structured document to identify one or more objects from a plurality of objects embedded within the displayed structured document, wherein a user can interact with the objects, which comprise content;

responsive to detected interaction by a first user with a first object of the one or more identified objects, wherein the first user and the first object are represented by respective nodes in a social graph, generate data relating to an edge relationship between the node representing the first object and the node representing the first user, wherein an edge type for the edge relationship is based at least in part on the detected interaction by the first user with the first object; and transmit the data indicating the edge relationship to a social-networking system.

17. The media of claim 16, wherein the software is further operable when executed to:

generate an activity stream entry corresponding to the interaction, the activity stream entry comprising data describing the first object; and transmit the activity stream entry to the social-networking system.

18. The media of claim 16, wherein one or more of the objects have an edge type.

19. The media of claim 18, wherein the edge type is based at least in part on or more previous interactions between one or more second users and the displayed structured document.

20. The media of claim 16, wherein transmitting the data is based at least in part on a set of user preferences for the social-networking system for the first user.

* * * * *